United States Patent
Shimmo et al.

(10) Patent No.: US 7,666,492 B2
(45) Date of Patent: Feb. 23, 2010

(54) MULTILAYER STRUCTURE AND METHOD FOR MANUFACTURING THE SAME

(75) Inventors: Katsuhide Shimmo, Tokyo (JP); Yasuji Sasaki, Tokyo (JP); Masahiro Oikawa, Tokyo (JP); Keiji Tsunetomo, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 791 days.

(21) Appl. No.: 10/996,373

(22) Filed: Nov. 26, 2004

(65) Prior Publication Data

US 2005/0153105 A1    Jul. 14, 2005

(30) Foreign Application Priority Data

Nov. 28, 2003  (JP) ........................... P2003-400285
Oct. 4, 2004   (JP) ........................... P2004-290883

(51) Int. Cl.
   *B32B 3/00*   (2006.01)
   *C09K 19/00*  (2006.01)
   *G02B 5/30*   (2006.01)
   *G02F 1/00*   (2006.01)

(52) U.S. Cl. ................. 428/161; 428/1.31; 428/164; 428/172; 428/432; 359/321; 359/485; 359/493

(58) Field of Classification Search ............... 428/1.51, 428/161, 163, 164, 167, 172, 212, 428, 432, 428/1.31; 359/321, 485, 489, 493
See application file for complete search history.

(56) References Cited

U.S. PATENT DOCUMENTS 6,555,236 B1 *  4/2003  Nakamura et al. .......... 428/447
6,753,064 B1    6/2004  Nakama et al.

FOREIGN PATENT DOCUMENTS

| CN | 1316946 A    | 10/2001 |
|----|--------------|---------|
| EP | 0110382      | 6/1984  |
| JP | 2000-056133  | 2/2000  |
| JP | 2000-131522  | 5/2000  |
| JP | 2003-227931  | 8/2003  |

OTHER PUBLICATIONS

The Office Action issued by the Chinese Patent Office on Apr. 6, 2007, in Chinese, Japanese and English languages, pp. 1 to 16.

* cited by examiner

*Primary Examiner*—Donald Loney
(74) *Attorney, Agent, or Firm*—Whitham Curtis Christofferson & Cook, PC

(57) ABSTRACT

A surface of a substrate is coated with a sol solution containing metal alkoxide. A gelled material of the sol solution is pressed against a molding tool while the gelled material is kept soft. Thus, the gelled material is molded. Then, the gelled material is hardened. As a result, protrusions of the hardened gel layer 14 are formed on the substrate so that an irregular texture substrate is formed. A multilayer thin film constituted by a plurality of layers of at least two kinds of materials with different refractive indexes is laminated on a surface of the irregular texture substrate.

6 Claims, 4 Drawing Sheets

MULTILAYER STRUCTURE AND METHOD FOR MANUFACTURING THE SAME

BACKGROUND OF THE INVENTION

1. Field of the Invention

The present invention relates to a multi-dimensional periodic structure applicable to a polarizing optical element or a photonic crystal in the optical field, and particularly relates to a multilayer structure using a multilayer film.

2. Related Art

A photonic crystal has a texture whose refractive index changes with a period near the wavelength of light. It is expected that the unique properties of the photonic crystal can be used for achieving optical applications which could not be achieved heretofore. A polarizing property is one of the unique properties. It is expected that the polarizing property of the photonic crystal can be applied to a polarizing optical element which is an essential optical component in a wide technical field related to optical communication, display, optical recording, optical measurement, etc.

For the photonic crystal, it is necessary to produce a periodic structure with a very fine texture. As a method for manufacturing such a structure, there is known a method of laminating thin films of materials with different refractive indexes (e.g. see Japanese Patent Publications No. JP 2000-56133A and JP 2000-131522A). The method can comparatively easily form a two-dimensional or three-dimensional periodic texture by forming a very fine irregular texture in advance on the surface of a substrate, and forming thin films thereon so that the thin films reflect the shape of the substrate surface.

A method for forming concave portions in the substrate by etching is used as the method for forming a periodic irregular texture in the substrate surface. In the method, a mask having a periodic pattern is formed on the surface of a glass or silicon substrate by photolithography, and concave portions are formed in the glass or silicon substrate by vapor phase etching such as ion beam etching through the mask (see JP 2000-56133A).

This method has a disadvantage as follows. That is, the periodic texture is formed only by forming the thin films. In contrast, photolithography and etching are required for processing the substrate. Thus, the processing cost increases and the processing time is also long, resulting in a bottleneck in the whole production process.

As a solution to the problem, there is known a method in which a resin material is used for a substrate and a periodic irregular texture is formed on the substrate by molding (see JP 2000-131522A). A resin having flowability is molded by a molding tool and hardened. Thus, an irregular texture can be formed. The method has an advantage as follows. That is, as long as the molding tool can be processed accurately, the molding tool can be used repeatedly. Thus, irregular textures having a fixed shape can be mass-produced.

Resin is generally low in heat resistance. When such a resin is used as a material of a substrate, restriction on temperature for forming thin films on the substrate may prevent the thin films from being formed with good quality. Moreover, even after the formation of an element, there is a problem in weather resistance. That is, the element using such a resin is degraded easily by heat, humidity, light, etc.

SUMMARY OF THE INVENTION

The present invention was developed to solve the aforementioned problems. An object of the invention is to provide a multilayer structure which is easy to be mass-produced and excellent in weather resistance.

A multilayer structure according to the invention has the following texture on the assumption that x- and y-axes are defined to be parallel to a surface of a flat-plate substrate and perpendicular to each other, and a z-axis is defined to be perpendicular to the substrate surface. In the structure, a layer in which a plurality of linear protrusions or grooves are formed to have a constant period in a direction of the x-axis and to extend in parallel to the y-axis is provided in at least a part of the substrate surface. A plurality of layers of at least two kinds of materials with different refractive indexes are laminated on the substrate and in a direction of the z-axis. Each of the laminated layers has irregularities in the x-axis direction with the same period as the period of the protrusions or grooves on the substrate surface. In the invention, a layer of a hardened gel material containing metal alkoxide is used as the protrusion or groove-including layer of the multilayer structure.

When the gel material containing metal alkoxide is used, protrusions or grooves can be produced accurately by molding. In addition, a layer formed out of the hardened gel material is mainly composed of inorganic components. It is therefore possible to provide a multilayer structure excellent in heat resistance and weather resistance.

A mixture containing various metals such as silicon (Si), germanium (Ge), titanium (Ti), etc. may be used as the metal alkoxide. In the invention, it is preferable that the metal alkoxide contains at least silicon (Si). Representative examples of the metal alkoxide containing Si include tetraethoxysilane and methyl triethoxysilane. Since the hardening speed of the metal alkoxide containing Si at the time of molding can be controlled easily and the metal alkoxide containing Si is excellent in transfer property, a high-accuracy molded article can be formed.

It is preferable that each side wall surface of each of the protrusions or grooves parallel to the y-axis has a maximum angle in a range of from 10° to 85° with respect to the surface of the flat-plate substrate. When the protrusions or grooves are formed by molding, it will be difficult to perform mold release if the angle of the side wall surface is larger than 85°. On the other hand, if the angle of the side wall surface is smaller than 10°, the protrusions or grooves cannot sufficiently serve as such.

Further, it is preferable that the x-z sectional shape of each of the protrusions or grooves in the protrusion or groove-including layer is trapezoidal or triangular.

Preferably, an absolute value of a thermal expansion coefficient of the flat-plate substrate is not higher than $100 \times 10^{-7} °C.^{-1}$. Soda lime-based silicate glass has such a positive thermal expansion coefficient. Borosilicate glass or quartz glass is smaller in thermal expansion coefficient than soda lime-based silicate glass. When the crystallinity of crystallized glass is adjusted, it is possible to provide a substrate whose thermal expansion coefficient is zero or a negative value. When the thermal expansion coefficient of the substrate is low, it is possible to prevent the protrusion or groove-including layer on the surface of the substrate from peeling off or cracking, so that it is possible to improve the heat resistance of the multilayer structure.

Further, in the multilayer structure, a plurality of linear protrusions or grooves parallel to one another may be provided with a constant period so as to cross the y-axis direction protrusions or grooves at a predetermined angle. In this case, each of the laminated layers may have not only the x-axis direction irregularities but also irregularities with the same period as the period of the protrusions or grooves crossing the y-axis direction protrusions or grooves.

Since the gel material containing metal alkoxide is used, it is possible to produce a complicated irregular texture accurately by molding. Thus, it is possible to provide a wide variety of multilayer structures having desired textures.

The multilayer structure is designed to have a polarizing function acting on light incident onto the multilayer structure in a direction parallel to the z-axis or in a direction not perpendicular but inclined with respect to the z-axis. Accordingly, it is possible to obtain a polarizing optical element excellent in weather resistance.

A method for manufacturing a multilayer structure according to the invention includes the steps of:

(1) applying a sol solution containing metal alkoxide to a surface of a flat-plate substrate;

(2) pressing a molding tool against a gel film changed from the sol solution and having flexibility, the molding tool having a plurality of linear concave or convex portions in parallel to one another and periodically;

(3) heating the gel film while keeping the molding tool pressed against the gel film;

(4) releasing the hardened gel film from the molding tool;

(5) heating and baking the hardened gel film; and (6) laminating a plurality of layers of at least two kinds of material with different refractive indexes onto the formed substrate including the plurality of linear protrusions or grooves.

It is possible to easily mass-produce multilayer structures having a desired texture by the step of molding the gel material containing metal alkoxide. Accordingly, it is possible to easily manufacture polarizing optical elements excellent in heat resistance and weather resistance.

Preferably, the temperature for heating and baking the hardened gel film is not lower than 150° C. When the baking is performed at a temperature lower than 150° C., the protrusions or grooves will be deformed or broken due to increase in the temperature at the time of film formation. Incidentally, the upper limit of the heating and baking temperature depends on the thermal expansion coefficient of the undercoat substrate and the softening or deforming temperature of the substrate.

According to the invention, it is possible to provide a multilayer structure high in heat resistance and excellent in weather resistance. It is therefore possible to easily manufacture a polarizing optical element using the multilayer structure.

DETAILED DESCRIPTION OF THE PREFERRED EMBODIMENTS

An embodiment of the invention will be described below in detail.

Figure 1A:
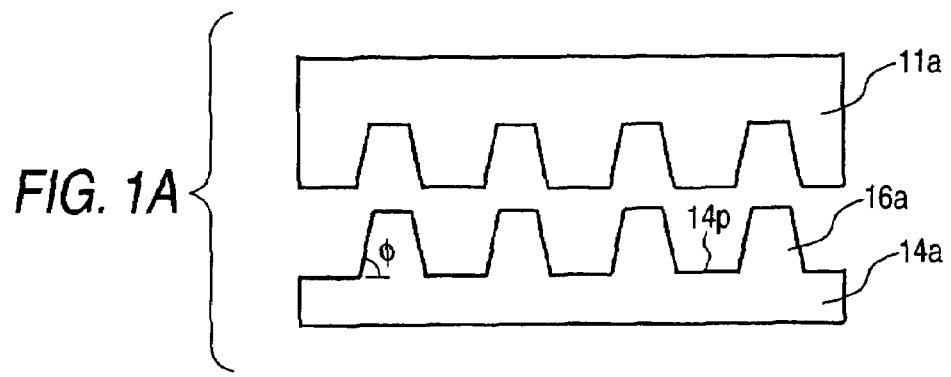
FIGS. 1A to 1C are schematic sectional views showing protrusion or groove-including layers and molding tools for manufacturing the layers according to the invention.
Figure 1B:
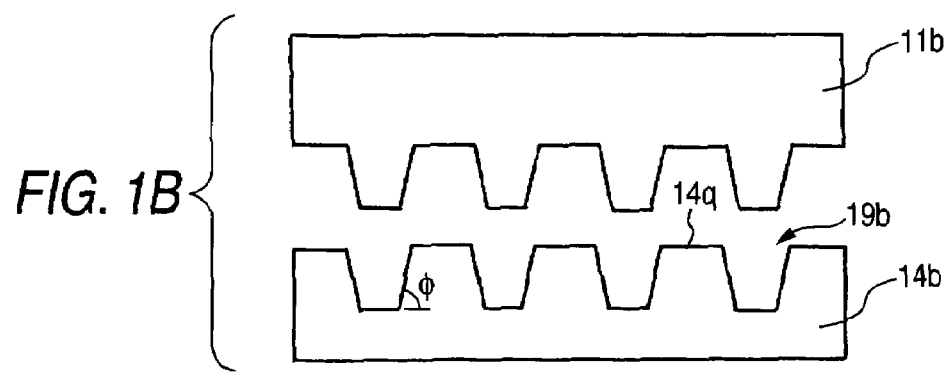
Figure 1C:
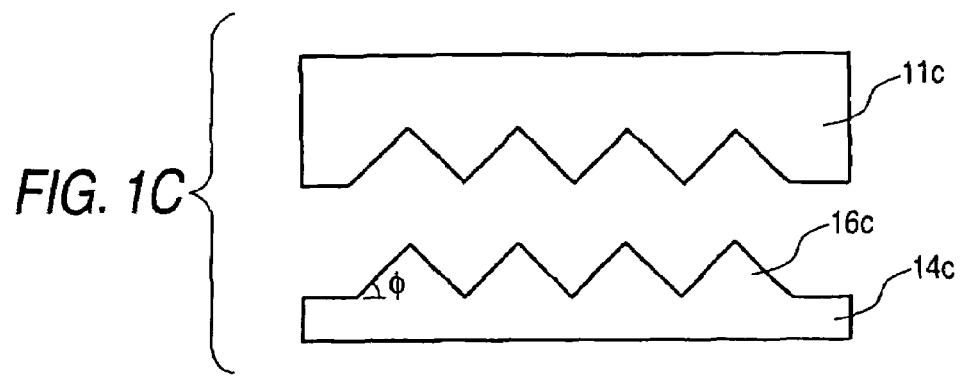

A protrusion or groove-including layer for use in a multilayer structure according to the embodiment is manufactured in a molding method. Here, the "protrusion" means a linear convex portion formed on a flat surface and the "groove" means a linear concave portion formed likewise. FIGS. 1A to 1C are schematic sectional views showing surface shapes of such layers and molding tools for manufacturing the layers. FIG. 1A shows a gel layer 14a including protrusions 16a formed by a molding tool 11a. FIG. 1B shows a gel layer 14b including grooves 19b formed by a molding tool 11b. FIG. 1C shows a gel layer 14c including protrusions 16c formed by a molding tool 11c.

The sectional shape of each protrusion or groove as shown in each of FIGS. 1A to 1C is trapezoidal or triangular by way of example. The sectional shape of the protrusion or groove is not limited thereto. For example, each side wall surface of the protrusion or groove may be curved, or may be constituted by a plurality of faces. It is preferable that a maximum value of an angle $\phi$ of the side wall surface of the protrusion or groove with respect to the surface of a flat-plate substrate is not larger than 85° C. The angle $\phi$ is constant when the side wall surface is constituted by a flat surface as shown in FIGS. 1A to 1C. However, the angle $\phi$ changes within an inclined surface when the side wall surface is constituted by a curved surface or a plurality of faces. In such a case, pay attention to the maximum value of the angle $\phi$. If the maximum value of the angle $\phi$ is larger than 85° and approaches 90°, release from the molding tool will be difficult. If the maximum value of the angle $\phi$ is larger than 90°, release from the molding tool will be almost impossible.

On the other hand, if the angle $\phi$ is small, the height of the protrusion or the depth of the groove will be so small that the protrusion or groove cannot serve as a convex or concave portion. It is preferable that the maximum value of the angle $\phi$ is at least 10°.

Although each of FIGS. 1A to 1C shows the example where lengths of two oblique sides of the trapezoid or triangle are equal to each other, the lengths of the two oblique sides may be different from each other. Particularly in the case of the triangle, the protrusion or groove may be shaped like a so-called sawtooth in section.

Incidentally, in the example of FIG. 1A or 1B, a flat surface 14p or 14q parallel to the surface of the flat-plate substrate is present between every two contiguous protrusions 16a or grooves 19b. Two contiguous inclined surfaces may intersect directly without provision of the flat surface 14p or 14q. Although the protrusions 16c are formed to be continuous to one another with no flat surface portion therebetween in the example of FIG. 1C, a flat surface portion parallel to the substrate surface may be provided between every two continuos protrusions.

EXAMPLE 1

FIGS. 2A to 2E are views showing a process flow for manufacturing a substrate having an irregular texture in the surface. A groove-including substrate made of a resin was used as a molding tool 11. Each groove was 0.2 μm wide and 0.2 μm deep and the period of the parallel groove array was 0.4 μm.

Figure 2A:
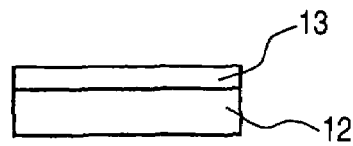
FIGS. 2A to 2E are views showing a process flow for manufacturing a substrate for use in a multilayer structure according to the invention.
Figure 2B:
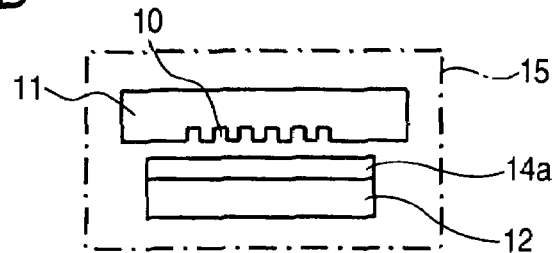
Figure 2C:
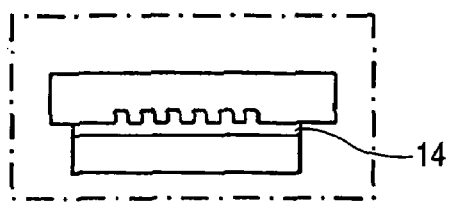
Figure 2D:
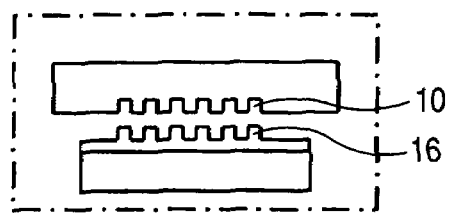

A glass substrate 12 was coated with a solution of a molding agent 13 prepared by adding polyethylene glycol to a sol solution containing tetraethoxysilane and an acid solution as main components (FIG. 2A). The coated glass substrate 12 was attached to a vacuum press apparatus 15 so as to face the molding tool 11 (FIG. 2B) A mold-release material was formed as a film on the surface of the molding tool in advance. The press apparatus was completely evacuated, and the molding tool 11 was pressed against the gel layer 14a on the substrate 12 while the gel layer 14a was soft (FIG. 2C). In that state, the substrate 12 was kept at 60° C. so as to harden the gel layer. After the inside of the press apparatus was restored to the atmosphere, the molding tool 11 was released from the hardened gel layer 14 (FIG. 2D).

Figure 2E:
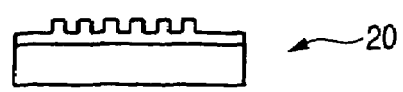

Protrusions 16 formed by transferring grooves 10 of the molding tool 11 were formed on the gel film surface. Heat treatment at 350° C. was performed on the gel film. Thus, an irregular texture substrate 20 for film formation was formed (FIG. 2E).

Each of the protrusions after the gel film had been hardened was 0.2 μm wide and 0.1 μm high and the period of the protrusion array was 0.4 μm.

Film formation was performed by a bias sputtering method in which a DC bias was applied to be superimposed on a high frequency voltage. This film formation method was adapted for an upper layer to reflect irregularities of a substrate. Two different kinds of materials, that is, targets of $SiO_2$ and Si were used so that ten $SiO_2$ layers and ten amorphous Si layers were formed alternately in an Ar gas atmosphere with a lamination period of 0.32 μm. For comparison, films of a polyimide resin were also formed on a substrate molded in the same manner.

Although the temperature of the substrate in the process reached a maximum temperature of almost 200° C., no change such as a crack was observed in the undercoat layer where protrusions were formed.

Figure 3:
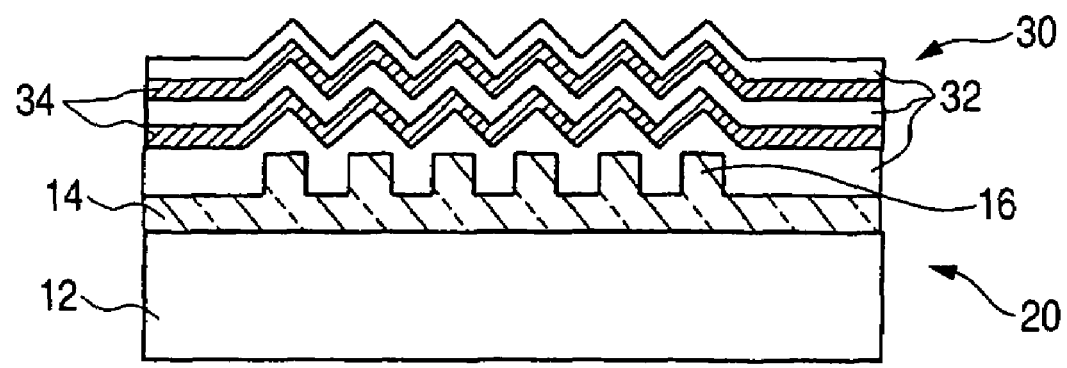
FIG. 3 shows a schematic sectional view of the multilayer structure according to the invention.
Figure 3:
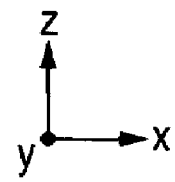

FIG. 3 shows a schematic view of an x-z section of the multilayer structure formed thus. An x-axis is defined as the periodic direction of the protrusions 16 formed periodically in the surface of the irregular texture substrate 20, a y-axis was defined as the longitudinal direction (direction perpendicular to the paper) of the protrusions 16, and a z-axis was defined as the lamination direction of the multilayer thin film 30 perpendicular to the substrate surface. The substrate surface is expressed by a plane parallel to the x-y plane. $SiO_2$ films 32 and amorphous Si films 34 are formed alternately on the irregular texture substrate 20 and the surface of each of the films has irregularities with the same period in the x-axis direction as the period of the irregularities of the substrate. Any period is hardly observed in the y-axis direction.

The multilayer structure having such a periodic irregular texture is called a photonic crystal. It is known that the photonic crystal has a band texture (photonic band) to the energy of incident light. When non-polarized light or elliptically polarized light is incident on such a photonic crystal in the z-axis direction, a TE-mode light beam and a TM-mode light beam are induced in the multilayer structure in accordance with a y-axis direction polarized wave parallel to the grooves and an x-axis direction polarized wave perpendicular to the y-axis direction polarized wave, respectively. If the frequency of light is within a photonic band gap, the light in that mode cannot be propagated in the multilayer structure so that the incident light is reflected or diffracted. On the other hand, if the frequency of light is within the photonic band, the incident light is transmitted through the multilayer structure. That is, the multilayer structure serves as a polarizing optical element.

In the multilayer structure according to the invention, frequency ranges where the photonic band gaps appear for the TE-mode and TM-mode can be controlled by controlling the period in the x-axis direction, that is, the period of the protrusions formed in the substrate surface, and the period in the z-axis direction, that is, the period of lamination of the multilayer films.

A TE wave and a TM wave each having a wavelength of 1 μm were incident individually on the multilayer structure manufactured thus in the z-axis direction, and the intensity of transmitted light in the multilayer structure was then measured. As a result, the TE wave was hardly transmitted while transmitted light of the TM wave was observed. When the polarizing property in the case where the polyimide substrate was used was evaluated, a property similar to that of the aforementioned multilayer structure was obtained.

EXAMPLE 2

A glass substrate was coated with a sol solution used as a solution of a molding agent and containing tetraethoxysilane, methyl triethoxysilane and an acid aqueous solution as main components. The coated substrate was attached to a press apparatus so as to face a molding tool formed in the same manner as in Example 1 and subjected to mold-release treatment. The molding tool was pressed against the gel film on the substrate in the atmosphere while the gel film was soft. In that state, the substrate was kept at 60° C. so as to harden the gel film. Then, the substrate was taken out from the press apparatus, and the molding tool and the hardened gel layer were released from each other.

Protrusions formed by transferring grooves of the molding tool were formed on the gel film surface. Heat treatment at 350° C. was performed on the gel film. Thus, an irregular texture substrate for film formation was formed).

Each of the protrusions after the gel film had been hardened was 0.2 μm wide and 0.1 μm high and the period of the protrusion array was 0.4 μm.

Film formation was performed in the same manner as in Example 1 so as to form a multilayer film in which ten $SiO_2$ layers and ten amorphous Si layers were formed alternately with a lamination period of 0.32 μm.

Although the temperature of the substrate in the process reached a maximum temperature of almost 200° C., no change such as a crack was observed in the undercoat layer where protrusions were formed.

The texture of the multilayer structure formed thus is substantially the same as in the case of Example 1.

A TE wave and a TM wave each having a wavelength of 1 μm were incident individually on the multilayer structure manufactured thus in the z-axis direction, and the intensity of transmitted light in the multilayer structure was then measured. As a result, the TE wave was hardly transmitted while transmitted light of the TM wave was observed. When the polarizing property in the case where the polyimide substrate was used was evaluated, a property similar to that of the aforementioned multilayer structure was obtained.

After the multilayer structures according to Examples 1 and 2 were kept at a high temperature of 85° C. and a high humidity of 85% for 1,000 hours, the multilayer structures were repeatedly subjected to a temperature cycle test. The temperature cycle test was repeatedly performed in twenty temperature change cycles each including retention at −20° C. for 20 minutes, raising to 80° C., retention at 80° C. for 20 minutes, and cooling to −20° C. again. After the test, the polarizing property of each of the multilayer structures was measured again. No change in the property was recognized between the multilayer structure before the test and the multilayer structure after the test. On the other hand, the polarizing property of the multilayer structure using the polyimide substrate was degraded due to partial peeling between the substrate and the multilayer film.

From the result, it is proved that the multilayer structure according to the invention and the polarizing optical element using the multilayer structure are excellent in humidity resistance and heat resistance and can sufficiently withstand a drastic temperature change. That is, it is proved that when the gel material containing metal alkoxide is molded and hardened so as to form the protrusions or grooves on the substrate, the polarizing optical element excellent in heat resistance and weather resistance can be manufactured easily.

Figure 4A:
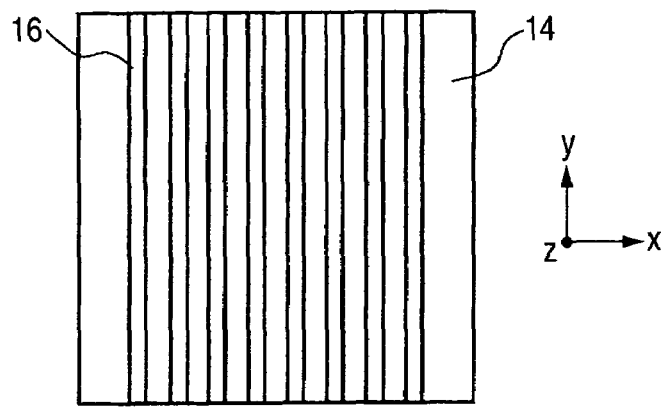
FIGS. 4A to 4C are schematic plan views showing substrates of multilayer structures according to the invention.

Incidentally, the embodiment has been described on the case where the protrusions on the substrate are periodic only in one direction (x-direction) by way of example. FIG. 4A shows a plan view of the substrate surface. Any complicated texture can be manufactured by the molding method, as long as a transfer mold is prepared. The period is not limited to a simple period as in the example of FIG. 4A. For example, the periodic texture may be formed to have units each having a plurality of protrusions or grooves with a period, or may include a portion having no irregularity.

Figure 4B:
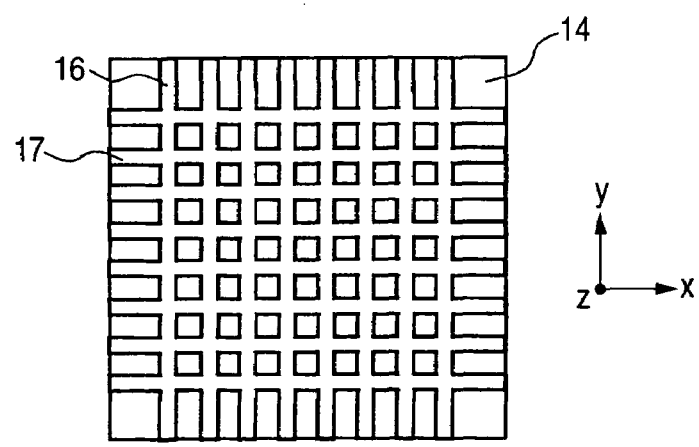
Figure 4C:
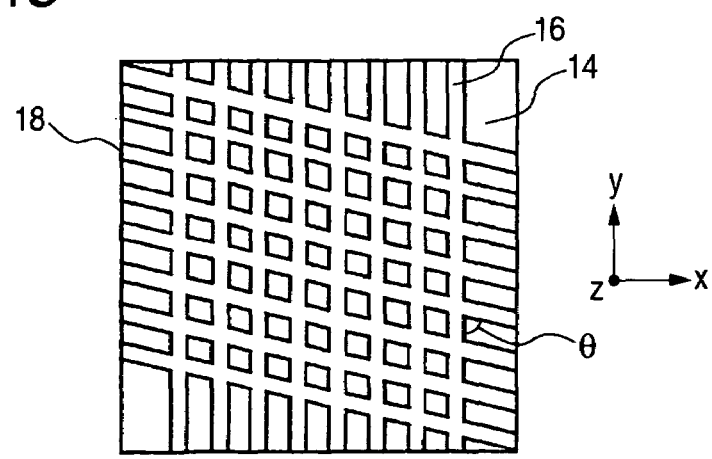

FIG. 4B shows an example of a substrate having not only a period in the x-direction but also a period in the y-direction. In this example, protrusions 16 and 17 in the two directions are perpendicular to each other and periods of the two sets of protrusions are equal to each other. The periods are not limited thereto. For example, protrusions 16 and 18 in two directions may cross each other at an angle θ as shown in FIG. 4C, or periods of the protrusions in the two directions may be different.

When such irregularities having periods in two directions are provided on the substrate, the layer laminated in the surface also reflects the undercoat layer so as to have irregularities with periods in the two directions. As a result, a photonic band can be formed two-dimensionally.

Tetraethoxysilane was used as the molding material for obtaining the protrusion or groove-including substrate. However, for example, any other metal alkoxide such as methyl triethoxysilane may be used. Besides $SiO_2$, $MgF_2$ or the like may be used as the low refractive index material of the film forming materials. Besides amorphous Si, a dielectric material such as $TiO_2$, $Ta_2O_5$, $Nb_2O_5$, or the like, may be used as the high refractive index material of the film forming materials.

The multilayer structure having a polarization function can be used as a polarizer in an optical isolator, an optical circulator, or the like, in the optical communication field. The multilayer structure can be also used as a polarizer widely used in the optical measurement field. The multilayer structure can be also applied to a wide variety of fields such as a polarizer for a liquid crystal display.

What is claimed is:

1. A multilayer structure comprising:
    a flat-plate substrate having a surface perpendicular to a z-axis and parallel to x- and y-axes that are perpendicular to each other;
    a base layer provided in at least a part of said surface of said flat-plate substrate, said layer having a plurality of linear protrusions or grooves which are disposed parallel to said y-axis at a constant period in a direction of said x-axis; and
    a plurality of laminated layers made of at least two kinds of materials with different refractive indexes and laminated in a direction of said z-axis and on said base layer having said protrusions or grooves, each of said laminated layers having irregularities in said x-axis direction with the same period as said period of said protrusions or grooves;
    wherein said layer having said protrusions or grooves is made of a hardened gel material containing metal alkoxide, and
    wherein an x-z sectional shape of each of said protrusions or grooves in said layer having said protrusions or grooves is trapezoidal.

2. A multilayer structure according to claim 1, wherein said metal alkoxide contains at least silicon.

3. A multilayer structure according to claim 2, wherein each side wall surface of each of said protrusions or grooves parallel to said y-axis has a maximum angle in a range of from 10° to 85° with respect to said surface of said flat-plate substrate.

4. A multilayer structure according to claim 1, wherein an absolute value of a thermal expansion coefficient of said flat-plate substrate is not higher than $100 \times 10^{-7}$ °$C.^{-1}$.

5. A multilayer structure according to claim 1, wherein another plurality of linear protrusions or grooves parallel to one another are provided with a constant period so as to cross said y-axis direction protrusions or grooves at a predetermined angle, and each of said laminated layers has not only said x-axis direction irregularities but also irregularities with the same period as said period of said protrusions or grooves crossing said y-axis direction protrusions or grooves.

6. A multilayer structure according to of claim 1, wherein said multilayer structure has a polarizing function acting on light incident onto said multilayer structure in a direction parallel to said z-axis or in a direction not perpendicular to said z-axis but inclined with respect to said z-axis.

* * * * *